(12) United States Patent
Parhar

(10) Patent No.: US 11,976,222 B2
(45) Date of Patent: *May 7, 2024

(54) SOLVENT CEMENT FORMULATIONS HAVING EXTENDED SHELF LIFE

(71) Applicant: OATEY CO., Cleveland, OH (US)

(72) Inventor: Amrit Parhar, Westlake, OH (US)

(73) Assignee: Oatey Co., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/112,643

(22) Filed: Feb. 22, 2023

(65) Prior Publication Data

US 2023/0203352 A1    Jun. 29, 2023

Related U.S. Application Data

(63) Continuation of application No. 17/155,556, filed on Jan. 22, 2021, now Pat. No. 11,597,859.

(60) Provisional application No. 62/965,329, filed on Jan. 24, 2020.

(51) Int. Cl.
| | | |
|---|---|---|
| C08K 5/00 | (2006.01) | |
| C09J 127/06 | (2006.01) | |
| C08F 8/20 | (2006.01) | |
| C08F 14/06 | (2006.01) | |
| C08K 5/1539 | (2006.01) | |

(52) U.S. Cl.
CPC ............ *C09J 127/06* (2013.01); *C08K 5/005* (2013.01); *C08F 8/20* (2013.01); *C08F 14/06* (2013.01); *C08K 5/1539* (2013.01)

(58) Field of Classification Search
CPC ................................. C09J 127/06; C08K 5/005
See application file for complete search history.

(56) References Cited

U.S. PATENT DOCUMENTS

| | | | |
|---|---|---|---|
| 2,685,551 A | 8/1954 | Spokes | |
| 3,226,359 A | 12/1965 | Ferner | |
| 3,234,173 A | 2/1966 | Mann et al. | |
| 3,503,917 A | 3/1970 | Burke, Jr. | |
| 3,765,983 A | 10/1973 | Putzier | |
| 3,770,682 A | 11/1973 | Farrell et al. | |
| 4,029,850 A * | 6/1977 | Ishii ...................... | B32B 27/322 |
| | | | 525/298 |
| 4,180,542 A | 12/1979 | Wrasman | |
| 4,268,559 A | 5/1981 | Smuckler | |
| 4,419,162 A * | 12/1983 | Fischer .................. | C08J 7/0427 |
| | | | 524/113 |
| 4,910,244 A * | 3/1990 | Dierdorf ............... | C09J 127/24 |
| | | | 524/178 |
| 5,098,878 A | 3/1992 | Hirschmann et al. | |
| 5,252,634 A | 10/1993 | Patel et al. | |
| 5,308,549 A * | 5/1994 | Laermer .............. | C08K 5/1545 |
| | | | 252/399 |
| 5,353,841 A | 10/1994 | Mathison et al. | |
| 5,376,717 A | 12/1994 | Patel et al. | |
| 5,416,142 A | 5/1995 | Bush et al. | |
| 5,422,388 A | 6/1995 | Patel et al. | |
| 5,470,894 A | 11/1995 | Patel et al. | |
| 5,495,040 A | 2/1996 | Patel et al. | |
| 5,561,173 A | 10/1996 | Dry | |
| 5,563,193 A | 10/1996 | Abel et al. | |
| 5,817,708 A | 10/1998 | Congelio et al. | |
| 5,852,091 A | 12/1998 | Waldrop et al. | |
| 5,855,708 A | 1/1999 | South | |
| 6,050,815 A | 4/2000 | Adam et al. | |
| 6,087,421 A | 7/2000 | Patel et al. | |
| 6,210,601 B1 | 4/2001 | Hottle et al. | |
| 6,214,158 B1 | 4/2001 | Chiu et al. | |
| 6,372,821 B1 | 4/2002 | Patel et al. | |
| 6,391,950 B1 | 5/2002 | Waldrop | |
| 6,429,242 B1 | 8/2002 | Macher et al. | |
| 6,652,704 B2 | 11/2003 | Green | |
| 6,887,926 B1 | 5/2005 | Parhar et al. | |
| 2003/0040594 A1 | 2/2003 | Steven et al. | |
| 2003/0080203 A1 | 5/2003 | Roth et al. | |
| 2003/0087986 A1 | 5/2003 | Mitra | |
| 2004/0194840 A1 | 10/2004 | Swingley | |
| 2005/0048280 A1 | 3/2005 | Stamper et al. | |
| 2005/0048857 A1 | 3/2005 | Terschueren et al. | |
| 2006/0030689 A1 | 2/2006 | Parhar et al. | |
| 2006/0189731 A1 | 8/2006 | Girois et al. | |
| 2006/0252865 A1 | 11/2006 | Bush et al. | |
| 2007/0142593 A1 | 6/2007 | Pawlow et al. | |
| 2007/0299190 A1 | 12/2007 | McDonald et al. | |
| 2008/0053842 A1 | 3/2008 | Williams et al. | |
| 2009/0110858 A1 | 4/2009 | Backman et al. | |
| 2009/0139661 A1 | 6/2009 | Frimel et al. | |
| 2010/0006220 A1 | 1/2010 | Parhar et al. | |

(Continued)

FOREIGN PATENT DOCUMENTS

| | | |
|---|---|---|
| CA | 2036083 A1 | 8/1991 |
| CA | 2156348 A1 | 2/1996 |

(Continued)

OTHER PUBLICATIONS

US 5,317,038 A, 05/1994, Naton (withdrawn)
"Vitamin C (ascorbic acid) oxidation & Preventing vitamin C Loss"; https://foodcrumbles.com/vitamin-c-orange-juice/; Food Crumbles; Oct. 2019; accessed Jul. 1, 2021; 11 pages.
International Patent Application No. PCT/US2021/031549; Int'l Search Report and the Written Opinion; dated Aug. 17, 2021; 23 pages.

(Continued)

*Primary Examiner* — Robert C Boyle

(74) *Attorney, Agent, or Firm* — BakerHostetler

(57) ABSTRACT

Disclosed are solvent cement formulations having beneficial stability and performance characteristics that include a thermoplastic resin, one or more organic solvents, an inhibitor of an oxidation-reduction reaction, and a heat stabilizer.

6 Claims, No Drawings

(56) References Cited

U.S. PATENT DOCUMENTS

| | | |
|---|---|---|
| 2011/0042937 A1 | 2/2011 | Malagnino |
| 2012/0043020 A1 | 2/2012 | Duff |
| 2012/0073974 A1 | 3/2012 | Abas et al. |
| 2012/0073976 A1 | 3/2012 | Chen et al. |
| 2013/0274149 A1 | 10/2013 | Lafitte et al. |
| 2014/0020828 A1 | 1/2014 | Parhar et al. |
| 2015/0056291 A1 | 2/2015 | Wibaux et al. |
| 2016/0115358 A1 | 4/2016 | Wu et al. |
| 2017/0130115 A1 | 5/2017 | Ballard |
| 2017/0172142 A1 | 6/2017 | Silbert et al. |
| 2017/0298192 A1 | 10/2017 | Löfstedt et al. |
| 2018/0044570 A1 | 2/2018 | Fernandez et al. |
| 2018/0142131 A1 | 5/2018 | Parhar et al. |
| 2018/0273807 A1 | 9/2018 | Jefferis et al. |
| 2018/0334585 A1 | 11/2018 | Wu et al. |
| 2019/0085220 A1 | 3/2019 | Parhar et al. |
| 2019/0162348 A1 | 5/2019 | Jung |

FOREIGN PATENT DOCUMENTS

| | | |
|---|---|---|
| CA | 2654970 A1 | 1/2008 |
| CN | 1844286 A | 10/2006 |
| CN | 101324530 A | 12/2008 |
| CN | 101870752 A | 10/2010 |
| CN | 101962522 A | 2/2011 |
| CN | 101962523 A | 2/2011 |
| CN | 101967359 A | 2/2011 |
| CN | 101985545 A | 3/2011 |
| CN | 102020949 A | 4/2011 |
| CN | 102020951 A | 4/2011 |
| CN | 102031079 A | 4/2011 |
| CN | 102179981 A | 9/2011 |
| CN | 102206474 A | 10/2011 |
| CN | 102351998 A | 2/2012 |
| CN | 102417800 A | 4/2012 |
| CN | 102417803 A | 4/2012 |
| CN | 103173134 A | 6/2013 |
| CN | 103656744 A | 3/2014 |
| CN | 106007443 A | 10/2016 |
| CN | 106279565 A | 1/2017 |
| CN | 106318279 A | 1/2017 |
| CN | 106479157 A | 3/2017 |
| CN | 106810183 A | 6/2017 |
| CN | 107083583 A | 8/2017 |
| CN | 107793938 A | 3/2018 |
| CN | 107987224 A | 5/2018 |
| CN | 108129091 A | 6/2018 |
| CN | 108300245 A | 7/2018 |
| CN | 108342144 A | 7/2018 |
| CN | 108467456 A | 8/2018 |
| CN | 109455988 A | 3/2019 |
| EP | 2814893 B1 | 1/2019 |
| FR | 0998770 A | 1/1952 |
| FR | 1398768 A | 5/1965 |
| FR | 1413751 A | 10/1965 |
| FR | 2248134 A1 | 5/1975 |
| GB | 0484088 A | 4/1938 |
| GB | 0654477 A | 6/1951 |
| GB | 1506242 A | 4/1978 |
| GB | 1576515 A | 10/1980 |
| JP | 58-089634 A | 5/1983 |
| JP | 58-091740 A | 5/1983 |
| JP | 58-091741 A | 5/1983 |
| JP | 02-219884 A | 9/1990 |
| JP | 2527843 B2 | 8/1996 |
| JP | 2851017 B2 | 1/1999 |
| JP | 3002897 B2 | 1/2000 |
| JP | 2005-075876 A | 3/2005 |
| JP | 2005-320843 A | 11/2005 |
| JP | 2007-009108 A | 1/2007 |
| JP | 2007-276267 A | 10/2007 |
| JP | 2012-219248 A | 11/2012 |
| KR | 10-2008-0007198 A | 1/2008 |
| KR | 10-1206378 B1 | 11/2012 |
| RU | 2291178 C1 | 1/2007 |
| RU | 2388780 C2 | 5/2010 |
| RU | 2435820 C1 | 12/2011 |
| SU | 0469726 A1 | 5/1975 |
| SU | 757575 A1 | 8/1980 |
| SU | 1002337 A1 | 3/1983 |
| WO | 98/18879 A1 | 5/1998 |
| WO | 99/61833 A1 | 12/1999 |
| WO | 2000/020689 A1 | 12/2000 |
| WO | 2002/010263 A2 | 2/2002 |
| WO | 2004/005356 A1 | 1/2004 |
| WO | 2007/030289 A1 | 3/2007 |
| WO | 2008/017117 A1 | 2/2008 |
| WO | 2011/097556 A1 | 8/2011 |
| WO | 2012/018713 A1 | 2/2012 |
| WO | 2012/078842 A1 | 6/2012 |
| WO | 2012/100876 A2 | 8/2012 |
| WO | 2012/140585 A1 | 10/2012 |
| WO | 2013/122458 A1 | 8/2013 |
| WO | 2014/178881 A1 | 11/2014 |
| WO | 2015/166126 A1 | 11/2015 |
| WO | 2016/144756 A1 | 9/2016 |
| WO | 2017/144929 A1 | 8/2017 |
| WO | 2017/155713 A1 | 9/2017 |
| WO | 2019/122773 A1 | 6/2019 |

OTHER PUBLICATIONS

ISA/220—Notification of Transmittal or Search Report and Written Opinion of the ISA, or the Declaration dated Aug. 17, 2021 for WO Application No. PCT/US21/031549.

Klein et al.; "Kinetic Study of Effect of Irganox E Antioxidants on Thermal Degradation of Poly(Vinyl Chloride)"; Chemical Papers; vol. 55; 2001; p. 67-70.

Van Krevelen et al.; "Chemical Degradation"; Chapter 22; 4th Edition Properties of Polymers; 2009; p. 779-786.

CO7120275A1; English Abstract; published Nov. 20, 2014; "Dispositivo para tratamiento de aguas residuales con reactor electroquímico de electrodos reemplazables y proceso de tratamiento"; https://worldwide.espacenet.com/publicationDetails/biblio?ll=0&ND=3&adjacent=true&locale=en_EP&FT=D&date=20141120&CC=CO&NR=7120275A1&KC=A1; accessed Feb. 1, 2021; 2 pages (no foreign documents available).

* cited by examiner

SOLVENT CEMENT FORMULATIONS HAVING EXTENDED SHELF LIFE

CROSS-REFERENCE TO RELATED APPLICATIONS

This application is a continuation of U.S. Ser. No. 17/155,556, filed Jan. 22, 2021, which claims the benefit of priority to U.S. Provisional App. No. 62/965,329, filed Jan. 24, 2020, the entire contents of both of which are incorporated herein by reference.

TECHNICAL FIELD

The present disclosure pertains to adhesives, such as for pipe joining applications.

BACKGROUND

Adhesives containing organic solvents have been used for many years for joining objects made from thermoplastic materials, such as PVC (polyvinyl chloride), CPVC (chlorinated polyvinyl chloride), and ABS (acrylonitrile-butadiene-styrene). In use, one or more of the present organic solvents partially dissolves or at least softens the surfaces to be joined, thereby achieving an intimate bond between these surfaces when the organic solvent evaporates. Normally, a small amount of thermoplastic resin, the same as or similar to the thermoplastic to be joined, is dissolved in the solvent, thereby producing what is referred to as a "solvent cement."

Solvent cements are conventionally used for joining PVC (polyvinylchloride) and CPVC (chlorinated polyvinylchloride) plastic pipe and fittings. The amount of such plastic pipe used for conveying a variety of liquids is enormous. The major uses are drain, waste, vent sewer and potable water conveyance. Plastic pipe has increasingly displaced the traditional materials used for the same purpose such as copper, steel, galvanized metal, cast iron, lead and concrete asbestos pipe. Plastic pipe has become the material of choice in the home, municipal, and manufacturing industries.

The ASTM standard for PVC solvent cements is ASTM D-2564. According to this standard, such solvent cements contain a minimum of 10% PVC resin, inert fillers, and the remainder is one or more solvents from the group of tetrahydrofuran (THF), cyclohexanone (CYH), MEK, and acetone.

ASTM F-493 sets forth the requirements for CPVC solvent cements as containing a minimum of 10% CPVC resin, inert fillers, and the remainder is one or more solvents including THF, CYH, MEK and/or acetone.

Solvent cements are subject to degradative influences during storage, for example, high temperature storage conditions, prior to use. For example, in addition to the resulting changes in the CPVC itself, due to the inevitable presence of moisture in the solvent cement (for example, as a result of exposure to atmospheric moisture or present as an impurity in the solvent), loss of chlorine can lead to container corrosion through the formation of hydrogen chloride. In order to store solvent cements containing CPVC for prolonged periods without any risk of corrosion, the adhesives may be stored in containers made of materials which withstand the chemical attack of hydrogen chloride. However, such containers as glass or polyolefin are unsuitable for other reasons.

The shelf-life of solvent cements containing CPVC resin is very short, particularly in warm environments in which the solvent cement is exposed to prolonged temperatures above about 120° F. As the CPVC-containing solvent cements are exposed to these high temperatures, the shelf-life can be reduced to as low as about six months. Shipping of product to locations across the world significantly reduces the amount of time the product can remain on shelves or be sold to end-consumers before the product must be scrapped. Scrapping old product increases costs required to manufacture the CPVC-containing solvent cement. As such, a need therefore exists for solvent cements containing CPVC resin that have increased shelf-life, particularly when exposed to prolonged high temperature environments.

Thus, solvent cements for both PVC and CPVC continue to require stabilization, such as against the effects of heat. In order to mitigate such problems, heat stabilizers, acid stabilizer, and radical stabilizers have been added to CPVC solvent cement formulations. U.S. Pat. No. 6,887,926 discloses CPVC solvent cement formulations containing a stabilizer comprising (i) at least one organophosphite compound, at and (ii) at least one metal-containing carbonate salt. U.S. Pub. No. 2014/0020828 discloses stabilizing agents for CPVC formulations that include alkyltin compounds, such as methyltin, butyltin and octyltin, dialkyltin dicarboxylates, methyltin mercaptides and butyltin mercaptides; dialkyltin bis(alkylmercaptocarboxylate) including di-n-octyltin-S,S'-bis(isooctylmercaptoacetate), butylthiostaunoic acid, and others.

A need persists for additional measures for ensuring the stability of solvent cements during storage.

Various organic solvents have been used for making organic solvent-based adhesives. Examples include ketones, ethers, esters, amides, carbonates, organic sulfoxides, organic sulfones, and organic sulfides. Mixtures of different solvents are common. See, for example, the following patent documents: U.S. 2006/0030689, U.S. Pat. Nos. 6,372,821, 6,087,421, 5,495,040, 5,470,894, 5,422,388, 5,416,142, 5,376,717 and 5,252,634.

Modern environmental and health guidelines recommend or require that the content of volatile organic compounds (VOCs) in consumer products be minimized and, where possible, eliminated. Tetrahydrofuran (THF) represents a common VOC in adhesive products, including solvent cements, in which that compound functions to dissolve thermoplastics and enhance the viscosity of the adhesive formulation. In view of the status of THF as a volatile organic compound, previous efforts have been made to reduce or exclude THF from adhesive formulations, including solvent cements. A need remains, however, for adhesive formulations in which the concentration of THF is reduced relative to traditional adhesives, or is eliminated entirely, but that have the characteristics, such as viscosity, that are necessary for effective use in regular-, medium-, and heavy-duty pipe joining applications.

SUMMARY

Disclosed herein are solvent cement formulations comprising a thermoplastic resin; cyclopentanone and one or more additional organic solvents; an inhibitor of an oxidation-reduction reaction; and, a heat stabilizer. In certain embodiments, the one or more additional organic solvents do not include tetrahydrofuran (THF).

Also provided are methods for bonding a first plastic part to a second plastic part comprising applying a solvent cement formulation according to the preceding description to at least a portion of the first plastic part; and, contacting the second plastic part to the portion of the first plastic part to which the solvent cement was applied.

The present disclosure also provides articles comprising first plastic part and a second plastic part that is bonded to the first plastic part by a solvent cement formulation according to the preceding description.

DETAILED DESCRIPTION OF ILLUSTRATIVE EMBODIMENTS

The present inventions may be understood more readily by reference to the following detailed description taken in connection with the accompanying examples, which form a part of this disclosure. It is to be understood that these inventions are not limited to the specific formulations, methods, articles, or parameters described and/or shown herein, and that the terminology used herein is for the purpose of describing particular embodiments by way of example only and is not intended to be limiting of the claimed inventions.

As employed above and throughout the disclosure, the following terms and abbreviations, unless otherwise indicated, shall be understood to have the following meanings.

In the present disclosure the singular forms "a," "an," and "the" include the plural reference, and reference to a particular numerical value includes at least that particular value, unless the context clearly indicates otherwise. Thus, for example, a reference to "a component" is a reference to one or more of such reagents and equivalents thereof known to those skilled in the art, and so forth. Furthermore, when indicating that a certain element "may be" X, Y, or Z, it is not intended by such usage to exclude in all instances other choices for the element.

When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" can refer to a value of 7.2 to 8.8, inclusive. This value may include "exactly 8". Where present, all ranges are inclusive and combinable. For example, when a range of "1 to 5" is recited, the recited range should be construed as optionally including ranges "1 to 4", "1 to 3", "1-2", "1-2 & 4-5", "1-3 & 5", and the like. In addition, when a list of alternatives is positively provided, such a listing can also include embodiments where any of the alternatives may be excluded. For example, when a range of "1 to 5" is described, such a description can support situations whereby any of 1, 2, 3, 4, or 5 are excluded; thus, a recitation of "1 to 5" may support "1 and 3-5, but not 2", or simply "wherein 2 is not included."

Although previous work has attempted to address the need for solvent cement formulations that are more reliably stable under storage conditions, few efforts have provided satisfactory results. The present inventors have discovered that solvent cement formulations that contain an inhibitor of an oxidation-reduction reaction and a heat stabilizer have excellent stability during extended periods of storage, while providing a high level of bonding performance, as confirmed by testing in accordance with industry standards.

Accordingly, provided herein are solvent cement formulations comprising a thermoplastic resin; cyclopentanone and one or more additional organic solvents; an inhibitor of an oxidation-reduction reaction; and, a heat stabilizer. In certain embodiments, the one or more additional organic solvents do not include tetrahydrofuran (THF).

Solvent cement formulations typically include a resin that is chemically similar to the thermoplastic material of which the objects to be bonded are made. The present formulations are especially suitable for use in bonding objects formed from one or more of polyvinylchloride (PVC), chlorinated polyvinyl chloride (CPVC), and acrylonitrile butadiene styrene (ABS) together.

Any suitable thermoplastic polymer may be used as a resin in the present solvent cement formulations. Exemplary thermoplastic polymers include vinyl chloride polymers or copolymers including, for example, PVC and CPVC. Vinyl chloride polymers and copolymers are well known among those skilled in the art. Copolymers of vinyl chloride include, for example, copolymers of vinyl chloride with one or more copolymerizable monomers having at least one terminal $CH_2=C$ group, such as other vinyl halides and vinylidene halides; acrylic acid, esters of acrylic acid such as methyl acrylate, or ethyl acrylate; methacrylic acid; esters of methacrylic acid; nitriles, such as acrylonitrile and methacrylonitrile; acrylamides, such as methyl acrylamide; vinyl ethers, such as ethyl vinyl ether; vinyl ketones; vinyl acetate; and vinyl pyridine. Copolymers of vinyl chloride may contain up to 50%, or up to 20% of the copolymerizable monomers.

Chlorinated polyvinyl chloride (CPVC) resins that may be included in the present formulations include chlorinated polyvinyl chloride (also referred to sometimes as post-chlorinated PVC) homopolymers and copolymers. CPVC resins may be prepared by chlorination of any of the polyvinyl chloride homopolymers or copolymers discussed above by procedures known among those skilled in the art. CPVC resins available commercially, are generally available as powders, and may contain from about 57% to about 75% by weight of chlorine. CPVC is often the resin of choice where its high heat deflection resistance is desirable such as in hot water piping systems. CPVC resins useful as the water-insoluble resin in the composition of the invention are available commercially from, for example, The Lubrizol Corporation under the trade designation Temprite 674X571. Chlorinated polyvinyl chlorides are available from ATOFINA under the tradename Lucalor™.

The solvent cement formulations of the present invention may comprise at least one chlorinated polyvinyl chloride or a mixture of at least one chlorinated polyvinyl chloride and at least one polyvinyl chloride. When a mixture of thermoplastic polymer is used, the mixture may contain about 1-95% by weight chlorinated polyvinyl chloride. In some embodiments, the amount of chlorinated polyvinyl chloride is at least 10% by weight. In other embodiments, the amount of chlorinated polyvinyl chloride is about 10-90%, about 10-80%, about 10-60%, about 10-20%, or any other amount from about 10 to about 95% by weight.

In some embodiments, the inherent viscosity of the PVC polymers and copolymers may range from about 0.30 to 1.5, or from about 0.30 to 0.95. PVC homopolymers and copolymers are available from a number of commercial sources. For example, a PVC homopolymer resin is available for Occidental Chemical Corporation under the designation OXY 190 or Geon such as Geon 110X334. Copolymers are available from Occidental Chemical Corporation under the designation OXY 1415 (16% bound vinyl acetate, inherent viscosity 0.37, and bulk density 0.66 g/cc) and OXY 1515 (13.8% bound vinyl acetate, inherent viscosity 0.47, and bulk density of 0.61).

In certain embodiments, the thermoplastic polymer resins include CPVC or CPVC and at least one of PVC or ABS. In further embodiments, one or more other polymers may be used in a solvent cement formulation instead of, or in addition to, these polymers. Other polymers include epoxies, phenolics, phenol-aldehydes, urea-aldehydes, polyesters, polycarbonates, polyacrylates, polyacrylamides, polyamides, furans, polyvinyl acetates, polyvinylidene fluoride (PVDG), styrene polymers, terpolymers of acrylonitrile, butadiene and alpha-methyl styrene, terpolymer of methyl or ethyl acrylate, butadiene and styrene, terpolymers of acrylic esters, styrene and acrylonitrile (ASA), polymers of styrene and maleic anhydride (SMA), styrene-acrylonitrile polymers (SAN), cellulose acetate, cellulose acetate butyrate, cellulose propionate, cellulose nitrate, polysulfonates, polysulfides, polyphenylene oxides (PPO), and polyetheramides.

The polyvinyl chloride, chlorinated polyvinyl chloride, ABS, or combination thereof of resins may constitute the majority of thermoplastic polymer dissolved in the solvent cement formulations. For example, these polymers may be present in amounts equal to or greater than 55, 60, 70, 80, 90, or 95% by weight of the total weight of the thermoplastic polymers that are present in the formulation. For example, the polyvinyl chloride, chlorinated polyvinyl chloride, ABS, or combination thereof may constitute about 55-100%, 60-100%, 70-100%, 80-100%, 90-100%, or 95-100% by weight of the total weight of the thermoplastic polymers that are present in the formulation. In some embodiments, a single thermoplastic polymer is present, i.e., the formulations include 100% or about 100% of a single type of thermoplastic polymer. For example, the solvent cement formulations may include only PVC, CPVC, or ABS. In one embodiment, the thermoplastic polymer is PVC. In another embodiment, the thermoplastic polymer is CPVC.

The thermoplastic polymer may be present in the solvent cement formulations in an amount of about 5 to 25% by weight, based on the total weight of the formulation. For example, the thermoplastic polymer may be present in an amount of about 6-23% by weight, about 7-21% by weight, about 8-20% by weight, about 9-20% by weight, about 10-20% by weight, about 10-18% by weight, about 12-17% by weight, about 13-15% by weight, or about 5, 6, 7, 8, 9, 10, 11, 12, 13, 14, 15, 16, 17, 18, 19, 20, 21, 22, 23, 24, or 25% by weight.

Some exemplary solvent cement formulations comprise cyclopentanone, which may be present in an amount of about 20 to about 65% by weight, based on the total weight of the formulation. For example, cyclopentanone may be present in an amount of about 20-60%, about 20-50%, about 25-50%, about 30-50%, or about 35-45% by weight, or in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60% by weight, based on the total weight of the formulation. It should be understood by one having ordinary skill in the art that other solvent cement formulations do not include cyclopentanone.

Some solvent cement formulations do not include tetrahydrofuran (THF), cyclohexanone, or both THF and cyclohexanone.

Some solvent cement formulations include one or more organic solvents that may include, for example, a lower alcohol, a ketone, an aldehyde, an ester, an ether, a halogenated solvent, N-methyl pyrrolidone, dimethyl-formamide, or any combination thereof. For example, the solvent may be selected from lower (e.g., $C_{1-8}$) alcohols such as methanol, ethanol and isopropanol; ketones such as acetone, methyl ethyl ketone (MEK), methyl isobutyl ketone, isophorone, or cyclohexanone (CYH), if cyclohexanone is not excluded; esters such as methyl acetate, ethyl acetate, ethyl formate, ethyl propionate, and butyl acetate; ethers such as methyl cellosolve (2-methoxyethanol), and dioxane; and other liquids, such as tetrahydrofuran (THF), N-methyl pyrolidone, and dimethylformamide (DMF). In some solvent cement formulation embodiments, the one or more solvents may include methyl ethyl ketone, acetone, cyclohexanone, methylene chloride, dimethylformamide (DMF), methyl isobutyl ketone (MIBK), 1,3 dioxane, methyl acetate, propyl acetate, N-methyl-2-pyrrolidone (NMP), propylene carbonate, tetrahydrofuran (THF), or any combination thereof. The solvent or combination of solvents may be selected based upon the type of thermoplastic polymer. In some embodiments, the solvent or combination of solvents do not include tetrahydrofuran (THF), cyclohexanone (CYH), or both THF and CYH. The solvent or combination of solvents should be capable of dissolving the chosen thermoplastic resin(s).

The present solvent cement formulations can include, for example, 2-35% methyl ethyl ketone (MEK) by weight. For example, the formulations may include about 2-35%, 2-30%, 4-35%, 4-30%, 4-20%, 5-30%, 7-30%, 10-30%, 12-30%, 12-20%, 14-20%, or 15-20%, or 2, 3, 4, 5, 6, 7, 8, 9, 10, 11, 12, 13, 14, 15, 16, 17, 18, 19, 20, 21, 22, 23, 24, 25, 26, 27, 28, 29, or 30% by weight MEK.

The present solvent cement formulations can include, for example, 10-25% acetone (ACE) by weight, based on the total weight of the formulation. For example, the formulations may include about 10-23%, 12-23%, 12-20%, 14-20%, 14-18%, 14-17%, or 15-17%, or 10, 11, 12, 13, 14, 15, 16, 17, 18, 19, 20, 21, 22, 23, 24, or 25% by weight ACE.

To the extent that some solvent cement formulations include cyclohexanone, the cyclohexanone (CYH) may be present in an amount of about 5-55% by weight, based on the total weight of the formulation. For example, the formulations may include 7-50%, 10-45%, 20-40%, or 25-35%, or 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, or 55% by weight CYH.

In certain embodiments, the additional organic solvent includes acetone, methyl ethyl ketone, cyclohexanone, tetrahydrofuran (THF), or any combination thereof. For example, the solvent cement formulations may include cyclopentanone, zero to about 35% by weight of methyl ethyl ketone, zero to about 55% by weight cyclohexanone, and zero to about 25% by weight of acetone, wherein at least two of these solvents are present in the solvent cement formulation, and wherein the total amount of solvent in the solvent cement formulation is about 75-85% by weight, based on the total weight of the formulation. The solvent cement formulations may include, for example, about 20-65% by weight cyclopentanone, about 4 to 35% by weight of methyl ethyl ketone, zero to about 55% by weight cyclohexanone, and 12-20% by weight of acetone, wherein the total amount of solvent in the solvent cement formulation is about 75-85% by weight, based on the total weight of the formulation.

The present solvent cement formulations also include an inhibitor of an oxidation-reduction reaction. Oxidation-reduction reactions within the solvent cement have been found to degrade the solvent cement as well as reduce the life of the container in which it is stored. Inhibiting oxidation-reduction reactions within the solvent cement formulations contemplated herein extends the shelf life of the solvent cement in the container. Exemplary inhibitors of an oxidation-reduction reaction include ascorbates, polyunsaturated fatty acid (PUFA), Vitamin E, and lecithin. In certain embodiments, the formulations include an ascorbate. For example, the solvent cement formulations may include ascorbic acid for inhibiting an oxidation-reduction reaction. The inhibitor of an oxidation-reduction reaction may be present in the formulations in an amount of about 0.1-1% by weight, based on the total weight of the formulation. For example, the inhibitor of an oxidation-reduction reaction may be present in the formulations in an amount of about 0.1-0.8, 0.2-0.7, 0.3-0.6, 0.4-0.6, or 0.4-0.5%, or about 0.1, 0.2, 0.3, 0.4, 0.5, 0.6, 0.7, 0.8, 0.9, or 1% by weight.

The present solvent cement formulations can further comprise a heat stabilizer. The heat stabilizer may be represented by a single component or by two or more components. Some suitable heat stabilizers are disclosed, for example, in U.S. Pat. No. 6,887,926. The stabilizer may comprise at least one organophosphite compound, a phenolic based stabilizer compound (i.e., stabilizer compound featuring a phenol group), and at least one metal-containing carbonate salt. In an exemplary stabilizer of this type for use in the present solvent cement formulations, the organophosphate compound is triphenyl phosphite, the phenolic based stabilizer compound is a butylated hydroxyl toluene (BHT), and the metal-containing carbonate salt is dihydroxyaluminum sodium carbonate. The stabilizers of U.S. Pat. No. 6,887,926 are especially suitable for use in solvent cement formulations in which the thermoplastic polymer is chlorinated, as in the case of CPVC.

Other types of stabilizing agents (e.g., for PVC, ABS, and CPVC formulations) include alkyltin compounds, such as octyl tin maleate, methyltin, butyltin and octyltin; dialkyltin dicarboxylates; methyltin mercaptides and butyltin mercaptides; dialkyltin bis(alkylmercaptocarboxylate) including di-n-octyltin-S,S'-bis(isooctyl mercaptoacetate); and butylthiostannoic acid. Di-lower alkyl tin stabilizers such as C4 to C8 alkyltin mercaptides are typically preferred. The stabilizers, when present, may be included in amounts of from about 0.05 to 3% by weight. Triphenyl phosphite, BHT (butylated hydroxy toluene), complex calcium and zinc soaps of alkyl carboxylic acids and hydrotalcite can also be used.

In some embodiments, the heat stabilizer includes butylated hydroxytoluene, dihydroxyaluminum sodium carbonate, and a calcium-zinc- or tin-based stabilizer. In certain other embodiments, the heat stabilizer includes triphenyl phosphite, dihydroxyaluminum sodium carbonate, and butylated hydroxytoluene.

Some solvent cement formulations of the present disclosure can include other components that confer desired properties. For example, exemplary formulations may include silica ($SiO_2$). The amount of silica in the formulations can be about 0.5-5% by weight. For example, the formulations may include 1-4%, 1.5-3.5%, 2-3%, about 0.5%, about 1%, about 1.5%, about 2%, about 2.5%, about 3%, about 3.5%, about 4%, about 4.5%, or about 5% silica.

Some solvent cement formulations can contain at least one solid particulate inorganic filler. In some embodiments, one or more fillers are present in a total amount of up to or about 5% by weight. More typically, the formulations can contain about 0.1% or 0.75% by weight up to about 1.5%, 3%, or 4% by weight of the solid particulate inorganic filler. The particulate inorganic fillers are inert and are generally included in the solvent cement formulations to improve working viscosity and structural strength, and to reduce production costs. The solid particulate inorganic fillers are preferably fine powders having an average particle size of less than about 50 microns and a density of less than about 4 g/mL. Examples include ground quartz, talc, magnesium silicate, calcium carbonate, clay, whiting, shell flour, wood flour, alumina, antimony trioxide, asbestos powder, barium sulfate, calcined clays, China clays, magnesium oxide, and mica powder.

Other optional components of the presently disclosed solvent cement formulations can include lubricants, plasticizers, colorants, pigments, thickeners (such as castor oil), emulsifiers, antioxidants, thixotropic agents, polymeric rheology additives, or processing aids.

Small amounts of pigments, colorants, or brighteners, such as titanium dioxide, carbon black, dyes, or other colorants may be added to the inventive formulations, for example, to serve as a guide for uniform mixing and to provide a method of distinguishing different adhesive compositions. The amounts of such additives are typically no more than about 2% by weight.

In some embodiments, the solvent cement formulations include an antioxidant, a filler, a colorant, an emulsifier, or any combination thereof.

As described above, the presently disclosed solvent cement formulations have exceptional stability during storage over extended periods of time. Stability during storage may be assessed in accordance with ASTM F493, which provides standards for CPVC solvent cement formulations. For example, the formulations may have a shelf life of at least three months, four months, five months, six months, seven months, eight months, nine months, ten months, 11 months, or one year when stored at a temperature of at least or about 120° F. in accordance with ASTM F493.

The viscosities of the present formulations are suitable for use in a wide range of applications. For example, a formulation according to the present disclosure may have a viscosity of about 500 to about 4500 cps, measured using a Brookfield viscometer. In some embodiments, the viscosity of the formulations is about 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, or 4500 cps.

Also provided are methods for bonding a first plastic part to a second plastic part comprising applying a solvent cement formulation according to any of the preceding embodiments to at least a portion of the first plastic part; and, contacting the second plastic part to the portion of the first plastic part to which the solvent cement was applied, thereby bonding the first plastic part to the second plastic part. The first and second plastic parts are preferably, but are not necessarily, formed from the same material, such as PVC, CPVC, or ABS, and are preferably, but are not necessarily, formed from the same material as the resin component in the solvent cement formulation. Any objects that the user wishes to bond can function as the first and second plastic parts. For example, the first part may be a piping component that includes a male end, and the second part may be a piping component that includes female end. However, the first and second plastic parts need not be piping components.

The step of applying the solvent cement to a surface of the first plastic part may be performed using any art-accepted process. For example, the solvent cement may be applied to the surface of the first plastic part by pouring, wiping, sprinkling, dabbing, brushing, spattering, or spraying the solvent cement onto the plastic component. The volume of solvent cement that is applied to the first plastic part should be sufficient to permit bonding between the first and second plastic parts, and may readily be determined by those of ordinary skill in the art, depending on the nature of the first and second parts, of the type of bond to be created, and the end use of the bonded components. If required, following the initial application, the solvent cement formulation may subsequently be subjected to smoothing or spreading in order to ensure a desired texture, thickness, or evenness on the portion of the first plastic part.

If desired, the present methods may also include applying the solvent cement to a surface of the second plastic part. Preferably, the surface of the second plastic part to which the solvent cement is applied represents at least a portion of the second plastic part that is contacted with a surface of the first plastic part, such as the surface of the first plastic part to which the solvent cement has also been applied.

Also provided herein are articles comprising a first plastic part that is bonded to a second plastic part by a solvent cement formulation according to the present disclosure. The first plastic part may be bonded to the second plastic component using any of the methods disclosed above for bonding a first plastic part to a second plastic part. The first and second plastic parts are preferably formed from the same material, such as PVC, CPVC, or ABS, and are preferably formed from the same material as the resin component in the solvent cement formulation. Any objects that the user wishes to bond can function as the first and second plastic part. For example, the first part may be a piping component that includes a male end, and the second part may be a piping component that includes female end. When the first and second plastic parts are each piping components, it can be said that the plastic article represents a section of piping.

However, the first and second parts are not limited to piping components. Those of ordinary skill in the art can readily identify other articles that can be formed from first and second plastic parts, such as housings for electronics, toys, household items, apparel, fencing, flooring, gutters, siding, window frames, automotive components, medical device components, and other articles. In certain embodiments, the plastic article comprises additional plastic components in addition to the first and second parts. In such instances, each of the components may be bonded to at least one of the other components by a solvent cement formulation according to the present disclosure.

When the articles are formed from piping components, the article can withstand hydrostatic burst pressures and pass hydrostatic sustained pressure tests according to applicable standards. For example, articles according to the present disclosure can withstand a hydrostatic burst pressure of at least 400 psi following a two hour curing period at 73° F. in accordance with ASTM F493. The articles may also be able to withstand a hydrostatic burst pressure of about 425, 450, 475, 500, 525, 550, 575, or 600 psi following a two hour curing period at 73° F. in accordance with ASTM F493. The articles may also be able to pass a hydrostatic pressure test in accordance with ASTM F493. According to this standard, the hydrostatic pressure test includes curing at 73° F. for 336 hours and curing at 180° F. for 48 hours, and testing of a ½" pipe in water at 180° F. for ability to withstand 521 psi for six mins and 364 psi for four hours.

Also provided are methods for preparing a solvent cement formulation according to the present disclosure comprising mixing a thermoplastic polymer with at least one solvent; and, adding a heat stabilizer and an inhibitor of an oxidation-reduction reaction into the mixture of the thermoplastic polymer and the at least one solvent; and, mixing the combination of the thermoplastic polymer, at least one solvent, heat stabilizer, and inhibitor of an oxidation-reduction reaction for an additional period of time following the step of adding of the heat stabilizer and inhibitor of an oxidation-reduction reaction. According to such methods, the respective identities of the thermoplastic polymer, the at least one solvent, the heat stabilizer, and inhibitor of an oxidation-reduction reaction may be in accordance with any embodiment disclosed above in connection with the inventive solvent cement formulations. In certain embodiments, the inhibitor of an oxidation-reduction reaction is an ascorbate, such as ascorbic acid. Preferably, the additional period of time during which the combination of the thermoplastic polymer, at least one solvent, heat stabilizer, and inhibitor of an oxidation-reduction reaction is mixed is no more than 5 minutes, such as about 4.5 minutes, 4 minutes, 3.5 minutes, 3 minutes, 2.5 minutes, 2 minutes, 1.5 minutes, 1 minute, 30 seconds, or less than 30 seconds. Mixing with respect to any of the steps of the present methods may be accomplished using standard equipment under conditions that are readily deemed suitable by those of ordinary skill in the art. For example, mixing may be accomplished using a standard laboratory mixer at a mixing speed of about 800 to about 2200 rpm, using a dispersion blade that is appropriate for the selected speed.

EXAMPLES

The following examples are set forth so as to provide those of ordinary skill in the art with a complete disclosure and description of how the formulations, methods, and articles claimed herein may be developed and evaluated, and are intended to be purely exemplary of the invention and are not intended to limit the scope of what the inventors regard as their invention. Efforts have been made to ensure accuracy with respect to numbers (e.g., amounts), but some errors and deviations should be accounted for.

Example 1—Preparation of Solvent Cement Formulations

Solvent cement formulations (Samples A-F) were respectively formed from the components as listed in Table 1, below, in the specified amounts, which are expressed in terms of percentage by weight, based on the total weight of the formulation.

TABLE 1

| | Sample | | | | | |
|---|---|---|---|---|---|---|
| Component | A | B | C | D | E | F |
| Cyclopentanone | 48 | 60 | 0 | 27 | 48 | 0 |
| MEK | 17 | 6 | 17 | 14 | 17.5 | 15.5 |
| ACE | 17 | 15 | 15 | 10 | 17 | 15 |
| CYH | 0 | 0 | 50 | 0 | 0 | 13 |
| THF | 0 | 0 | 0 | 30 | 0 | 36 |
| Heat Stabilizer | 3 | 3 | 3 | 3 | 3 | 3 |
| CPVC Resin | 12 | 13 | 12 | 13 | 12 | 15 |
| Ascorbic Acid | 0.5 | 0.5 | 0.5 | 0.5 | 0 | 0 |
| Fumed Silica | 2 | 2 | 2 | 2 | 2 | 2 |
| Dye | 0.5 | 0.5 | 0.5 | 0.5 | 0.5 | 0.5 |
| Total | 100 | 100 | 100 | 100 | 100 | 100 |

As provided in Table 1, Samples C and F did not include cyclopentanone; Samples A-C and E did not contain THF; Samples A, B, D, and E did not contain cyclohexanone (CYH); and, Samples A, B, and E did not contain THF or CYH, but did contain cyclopentanone. In addition, only Samples A-D included both a heat stabilizer and an inhibitor of an oxidation-reduction reaction (ascorbic acid), and, of these, only Samples A, B, and D also include cyclopentanone. The heat stabilizer that was used represented a package of multiple components.

Example 2—Shelf-Life Stability Assessment

Each of Samples A-F from Example 1 were tested in order to assess the ability of the samples to remain stable over time. All samples were placed in an oven at 120° F. or higher and monitored over time. The applicable standard was ASTM F493, which requires stability (e.g., no gelation or stratification that cannot be removed by stirring) after storage at 120° F. for at least one month. Results are provided in Table 2, below.

TABLE 2

| | Sample | | | | | |
|---|---|---|---|---|---|---|
| | A | B | C | D | E | F |
| Time Before Loss of Stability | >1 year | 7 mo | 3 wks | 7 mo | 3 mo | 6 mo |

As shown, Samples A, B, D, and F provided noticeably longer stability times than Samples C and E. Samples A and B did not include THF, and still provided longer stability times without the necessity for including that high VOC solvent.

Example 3—Assessment of Hydrostatic Burst Strength

Each of Samples A, B, and F from Example 1 were tested in order to assess hydrostatic burst strength, according to industry standards. In particular, ASTM F493 requires that a 2" pipe assembly that has been bonded with the test adhesive and cured for two hours at 73° F. is capable of withstanding a hydrostatic burst pressure of 400 psi. All samples met the requirement under ASTM F493, and the specific hydrostatic pressures at which failure ultimately occurred are provided in Table 3, below:

TABLE 3

| | Sample | | |
|---|---|---|---|
| | A | B | F |
| Hydrostatic burst strength (psi) | 600 | 560 | 590 |

Example 4—Additional Solvent Cement Formulations

Additional solvent cement formulations (Samples 1-5) were respectively formed from the components as listed in Table 4, below, in the specified amounts, which are expressed in terms of percentage by weight, based on the total weight of the formulation.

TABLE 4

| | Sample | | | | |
|---|---|---|---|---|---|
| Component | 1 | 2 | 3 | 4 | 5 |
| Cyclopentanone | 48 | 60 | 0 | 40 | 22 |
| Methyl Ethyl Ketone | 18 | 4 | 16 | 15 | 12 |
| Acetone | 15 | 17 | 15 | 15 | 15 |
| Cyclohexanone | 0 | 0 | 50 | 7 | 33 |
| CPVC Resin | 13 | 14 | 13 | 13 | 14 |
| Stabilizer | 3 | 3 | 3 | 3 | 3 |

TABLE 4-continued

| | Sample | | | | |
|---|---|---|---|---|---|
| Component | 1 | 2 | 3 | 4 | 5 |
| Fumed Silica | 2 | 2 | 2 | 2 | 2 |
| Ascorbic Acid | 0.5 | 0.5 | 0.5 | 0.5 | 0.5 |
| Colorant | 0.5 | 0.5 | 0.5 | 0.5 | 0.5 |
| Total | 100 | 100 | 100 | 100 | 100 |

As provided in Table 4, Sample 3 did not include cyclopentanone; none of the samples contained THF; and, Samples 1 and 2 did not contain cyclohexanone (CYH). All samples included both a heat stabilizer and an inhibitor of an oxidation-reduction reaction (ascorbic acid). The heat stabilizer that was used represented a package of multiple components.

Example 5—Assessment of Additional Solvent Cement Formulations

Formulations 1-5 from Example 4 were subjected to testing for viscosity, hydrostatic burst strength, hydrostatic sustained pressure, and shelf stability. Viscosity was measured using a Brookfield viscometer, and assessed for compliance with ASTM F493. Hydrostatic burst strength was assessed in accordance with the standard defined in ASTM F493, as described in Example 3, above. The hydrostatic sustained pressure test is also defined in ASTM F493, and requires ½" pipe that has been bonded with the test adhesive and cured for 336 hours at 73° F. and 48 hours at 180° F. can withstand 521 psi for 6 min and 364 psi for 4 hr at 180° F. The stability assessment was also in accordance with ASTM F493, as described in Example 2, above. Table 5, below, provides results.

TABLE 5

| | Sample | | | | |
|---|---|---|---|---|---|
| | 1 | 2 | 3 | 4 | 5 |
| Viscosity (cps) | 2000 | 4100 | 600 | 1300 | 1400 |
| Hydrostatic burst strength (psi) | 600 | 560 | 484 | 513 | 579 |
| Hydrostatic sustained pressure test | Pass | Pass | Pass | Pass | Pass |
| Time before loss of stability | 8 mo | 6 mo | 3 wk | 3 mo | 3 mo |

As shown above, all of Samples 1-5 met the minimum requirement of withstanding a hydrostatic burst pressure of 400 psi, and all of the samples passed the hydrostatic sustained pressure test. Sample 3, which contained cyclohexanone and did not include cyclopentanone, performed the least favorably under the stability test, while Samples 1 and 2, both of which contained no cyclohexanone, but did contain cyclopentanone in combination with the heat stabilizer and inhibitor of an oxidation-reduction reaction, evinced superior stability.

What is claimed:
1. A solvent cement formulation comprising:
polyvinyl chloride (PVC) resin;
one or more organic solvents;
a heat stabilizer; and
an inhibitor of an oxidation-reduction reaction.

2. The solvent cement formulation according to claim 1, wherein the one or more organic solvents includes a ketone, and do not include THF.

3. The solvent cement formulation according to claim 1, comprising cyclopentanone.

4. The solvent cement formulation according to claim 1, wherein the one or more organic solvents do not include cyclohexanone.

5. A solvent cement formulation comprising:
   polyvinyl chloride (PVC) resin;
   cyclopentanone and one or more additional organic solvents;
   a heat stabilizer; and
   an inhibitor of an oxidation-reduction reaction.

6. The solvent cement formulation according to claim 5, wherein the inhibitor of an oxidation-reduction reaction includes an ascorbate, a polyunsaturated fatty acid, Vitamin E, lecithin, or any combination thereof.

* * * * *